L. A. KLING.
CLUTCH MECHANISM.
APPLICATION FILED OCT. 25, 1913.
1,163,415.
Patented Dec. 7, 1915.
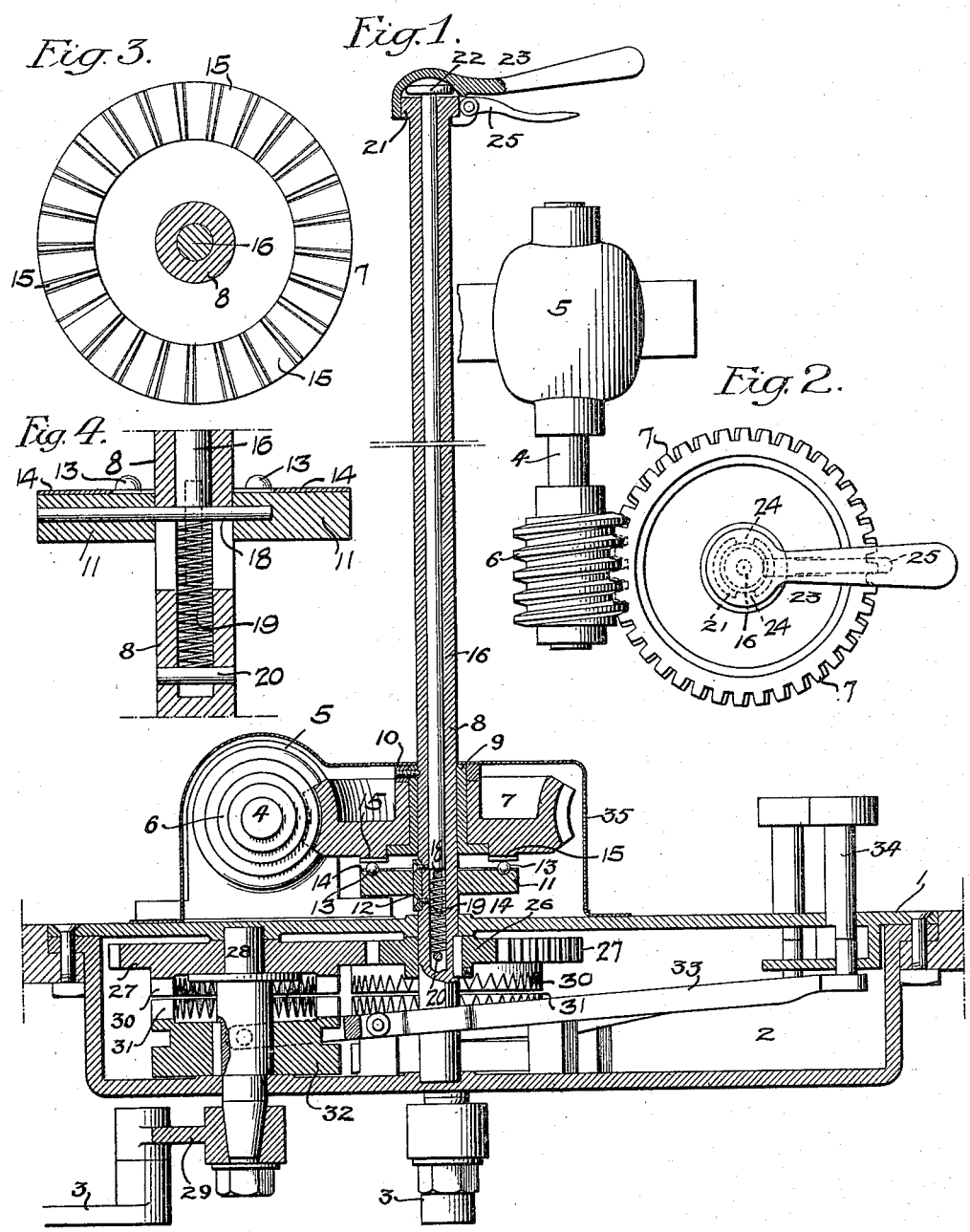
Inventor:—
Louis A. Kling.
by his Attorneys—

UNITED STATES PATENT OFFICE.

LOUIS A. KLING, OF EAST CLEVELAND, OHIO, ASSIGNOR TO THE J. G. BRILL COMPANY, OF PHILADELPHIA, PENNSYLVANIA, A CORPORATION OF PENNSYLVANIA.

CLUTCH MECHANISM.

1,163,415. Specification of Letters Patent. Patented Dec. 7, 1915.

Original application filed May 19, 1913, Serial No. 768,595. Divided and this application filed October 25, 1913. Serial No. 797,255.

*To all whom it may concern:*

Be it known that I, LOUIS A. KLING, a citizen of the United States, residing in East Cleveland, county of Cuyahoga, State of Ohio, have invented certain Improvements in Clutch Mechanism, (being a division of application filed May 19, 1913, under Serial No. 768,595,) of which the following is a specification.

My invention relates to certain improvements in means for operating clutches, particularly those used in connection with door operating mechanism of passenger cars such, for instance, as illustrated and claimed in an application filed by me on the 19th day of May, 1913, under Serial No. 768,595, and of which this application is a division.

The object of my invention is to simplify the construction of such mechanism and to provide means for operating the door operating mechanism either by power or by hand.

In the accompanying drawings: Figure 1 is a vertical sectional view of sufficient of a door controlling mechanism to illustrate my invention; Fig. 2 is a plan view of sufficient of the mechanism to illustrate my invention; Fig. 3 is an inverted plan view of the worm wheel showing the clutch face; and Fig. 4 is an enlarged sectional view of a portion of the disk and the shaft.

Referring to the drawings, 1, in the present instance, is the platform of a passenger car.

2 is a casing inclosing the clutch mechanism.

3, 3 are rods connecting the mechanism with the doors.

4 is a driving shaft coupled to a motor 5, illustrated in diagram, Fig. 2. On this shaft 4 is a worm 6 and meshing with the worm is a worm wheel 7 mounted loosely on a vertical shaft 8. In the present instance, a sleeve 9 having a flange at the lower end carries this wheel and at the upper end there is a ring 10, which is secured to the sleeve and to the shaft. Thus, the wheel 7, while it is free to turn, is held against longitudinal movement on the shaft.

Located under the worm wheel 7, in the present instance, is a disk 11 which has a keyway therein, and secured to the shaft is a key 12 so that while the disk can slide longitudinally on the shaft it must turn therewith.

13 is a series of balls secured in sockets in the disk 11 by an annular plate 14 which has holes through which the balls project. The balls bear against a clutch face on the under side of the wheel 7 and this clutch face is recessed, as at 15, forming pockets for the balls, so that when the balls are located in the pockets the wheel drives the disk and turns the shaft.

In order to move the disk to and from the wheel, I make the shaft 8 hollow for a certain distance and mount a rod 16 in this shaft. Extending through a slot 17 in the shaft 8 is a pin 18 which is secured in the disk 11 and under this pin is a spring 19 supported, in the present instance, by a cross bar 20 mounted in the shaft 8. The rod 16 rests upon the cross bar 18 and, when it is forced down, the disk 11 is forced away from the wheel 7 so that the wheel turns without turning the disk. When the rod is released the spring 19, which bears against the pin 18, forces the disk toward the wheel 7 and the balls 13 engage the notched surface of the wheel, the disk and its shaft turning with the wheel. Thus, motion is imparted to the mechanism which opens and closes the doors.

At the upper end of the tubular shaft, in the present instance, is a notched head 21 and the rod 16 has a head 22 projecting above the head 21 of the shaft. This can be pressed down by hand to release the disk 11 or it can be held down by a lever 23, which is shaped so as to fit over the head 21 and has lugs 24, which enter notches in the head 21, and has a pivoted catch 25, the short arm of which extends under the head 21. When the lever 23 is grasped by the hand, the shaft 8 can be turned by hand. When it is wished to release the lever the long arm of the latch 25 is pressed toward the lever so as to release it, allowing it to be removed. When the lever is in position, it forces the rod 16 down so that the spring is compressed and the disk, with the balls, is clear of the driven wheel. By this arrangement, the shaft can either be turned by power or by hand, as, in some cases, particularly in the operation of street cars, in some portions of the route, it is desirable to operate the doors by power and at other times by hand. In the present instance, the shaft is mounted in the casing 2 and has a pinion 26 keyed thereto and this pinion meshes with two or more gear wheels 27, according to the number of doors to be operated. These gear wheels are loosely mounted on shafts 28 having at their lower ends arms 29 which are secured to the rods 3 which connect the mechanism to the doors. On the under side of each gear wheel 27 are teeth 30 which mesh with the teeth 31 on clutch disks 32 splined to the shaft 28 and a lever 33 engages each clutch sleeve 32.

Each lever is controlled by a treadle plunger 34 so that, upon pressing down any one of the plungers, the particular shaft will be positively connected with the operating shaft 8 and the door will be opened or closed. This mechanism is clearly described in the above noted application for patent, of which this is a division.

In the present instance, I have shown the worm and worm wheel inclosed in a casing 35, but the entire mechanism may be located under the platform of the car or under the structure, if desired.

While I have illustrated the invention in connection with the door operating mechanism of passenger cars, it can be used for other purposes where it is desired to connect a power driven mechanism with a shaft or to arrange for the turning of the shaft either by hand or by power.

I claim:

1. The combination of a hollow shaft; a rod extending through the shaft; power driven means; clutch mechanism for transmitting power from the power driven means to the shaft and arranged to be released by the rod, the shaft having a notched head at one end, the rod extending beyond the head; and a hand lever for turning the shaft arranged to engage the notched head and capped so as to force the rod down to relieve the clutch mechanism.

2. The combination of a power driven shaft; a clutch thereon, said shaft being hollow; a rod extending through the shaft and engaging one member of the clutch mechanism and having a head at the opposite end, the shaft having a notched head at the same end; a capped lever fitting over the end of the shaft and the end of the rod and having lugs entering the notches; and a latch pivotally mounted on the lever and engaging the head on the shaft so that the clutch mechanism is held out of gear to allow the shaft to be turned by hand.

In testimony whereof, I have signed my name to this specification, in the presence of two subscribing witnesses.

LOUIS A. KLING.

Witnesses:
HENRY C. ESLING,
H. F. McKILLIP.